United States Patent
Popivalo

[15] 3,669,322
[45] June 13, 1972

[54] MEASURING AND DISPENSING CONTAINER

[72] Inventor: Andrew C. Popivalo, 2028 Webster Street, Sanger, Calif. 93657

[22] Filed: April 8, 1970

[21] Appl. No.: 26,530

[52] U.S. Cl. .............................222/454, 222/564, 229/7 R
[51] Int. Cl. ...............................................................G01f 11/26
[58] Field of Search..................222/130, 454, 455, 456, 457, 222/564; 229/7 R

[56] References Cited

UNITED STATES PATENTS

| | | |
|---|---|---|
| 3,235,144 | 2/1966 | Pitkin et al. ..........................222/456 X |
| 2,803,385 | 8/1957 | Silver et al. ............................222/456 |
| 1,498,491 | 6/1924 | Stinson .....................222/456 |
| 2,996,224 | 8/1961 | Silver........................................222/455 |
| 3,202,327 | 8/1965 | Haynie......................................222/455 |

*Primary Examiner*—Robert B. Reeves
*Assistant Examiner*—Frederick R. Handren
*Attorney*—Alexander B. Blair

[57] ABSTRACT

A container for free flowing granular and other particulate materials having a dispensing chute arranged to dispense a predetermined quantity of material each time the container is inverted. The chute and the supporting structure therefor folds with the container so that the container can be shipped flat and when erected for filling the chute and its supporting structure are simultaneously erected into operating position.

3 Claims, 7 Drawing Figures

PATENTED JUN 13 1972

INVENTOR.
ANDREW C. POPIVALO
BY
Alexander R. Blair
ATTORNEY.

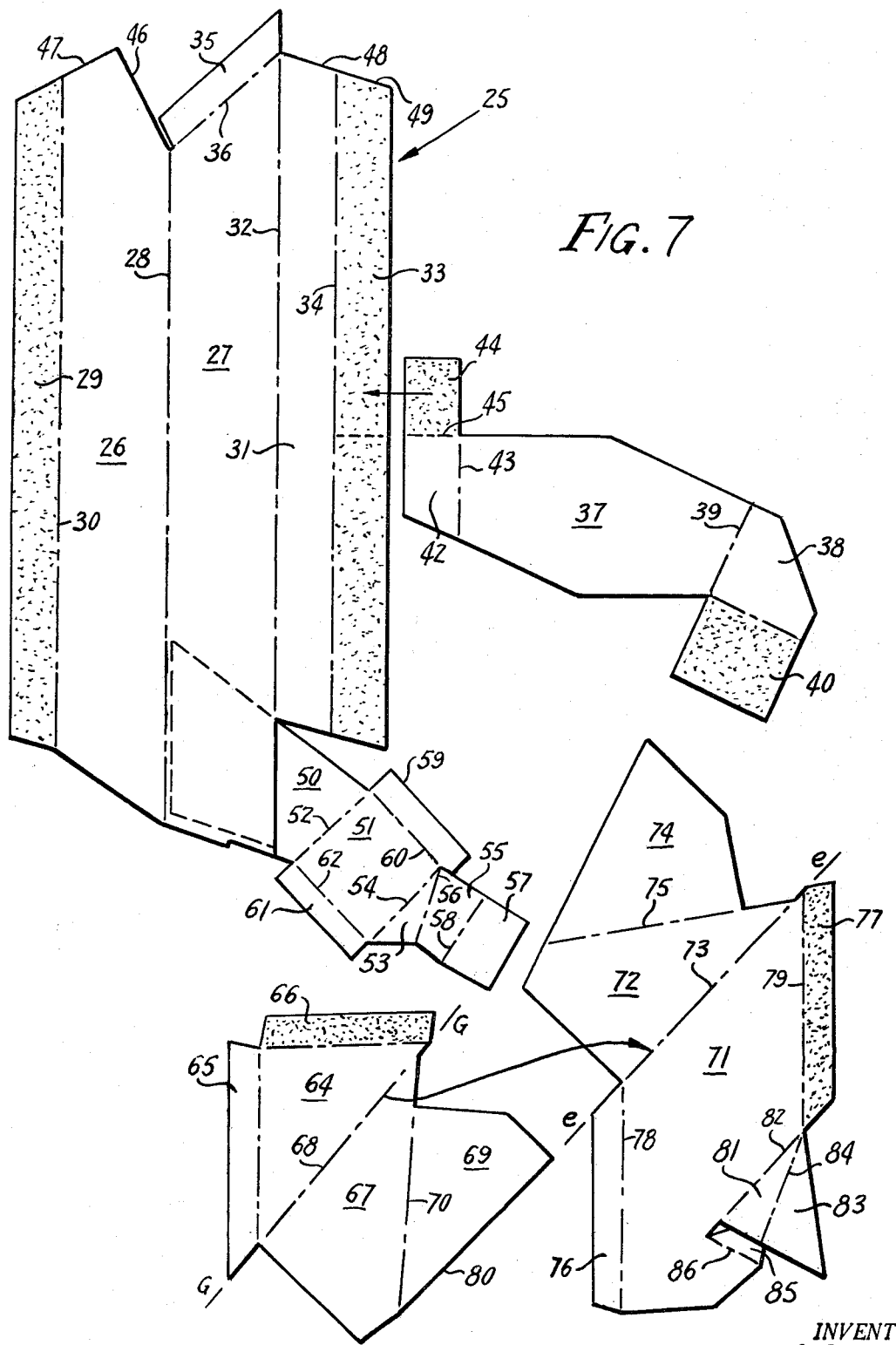

MEASURING AND DISPENSING CONTAINER

BACKGROUND OF THE INVENTION

1. Field of the Invention

The present invention relates to dispensing containers for granular and other particulate materials which will dispense a predetermined quantity of the material each time the container is inverted.

2. Summary of the Invention

The present invention is directed to generally rectangular containers for granular or other particulate material having a dispensing chute within the container and a measuring cup for feeding the chute with a predetermined quantity of the contents of the container each time the container is inverted. The container is shipped flat with the dispensing structure folded flat. In preparing the container for use it is normally erected into its rectangular form by mechanical equipment with the top and bottom walls being secured in closed position by glueing.

The primary object of the invention is to provide a dispensing container which can be shipped flat and erected at the point of filling with a minimum of effort.

Other objects and advantages will become apparent in the following specification when considered in light of the attached drawings.

BRIEF DESCRIPTION OF THE DRAWINGS

FIG. 7 is a plan view of the paperboard blanks from which the dispensing structure is formed.

DESCRIPTION OF THE PREFERRED EMBODIMENT

Figure 1:
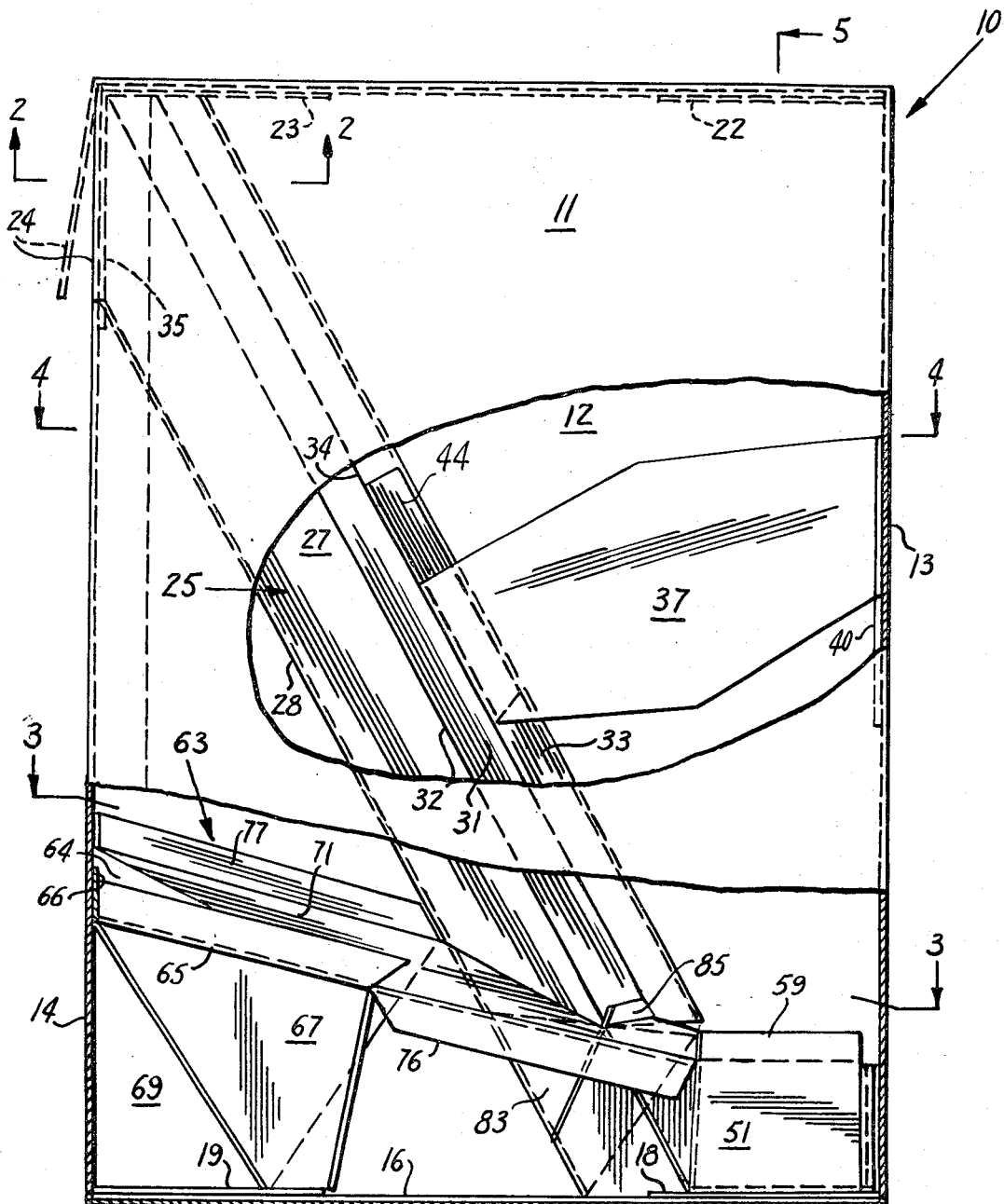
FIG. 1 is a side elevation of the invention shown partially broken away for convenience of illustration.
Figure 2:
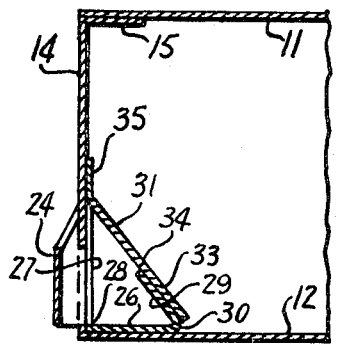
FIG. 2 is a fragmentary horizontal section taken along the line 2—2 of FIG. 1 looking in the direction of the arrows.
Figure 3:
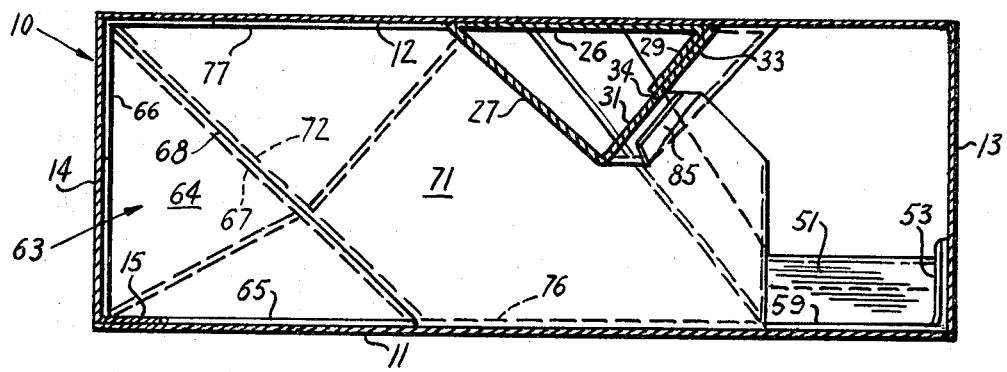
FIG. 3 is a horizontal sectional view taken along the line 3—3 of FIG. 1 looking in the direction of the arrows.
Figure 4:
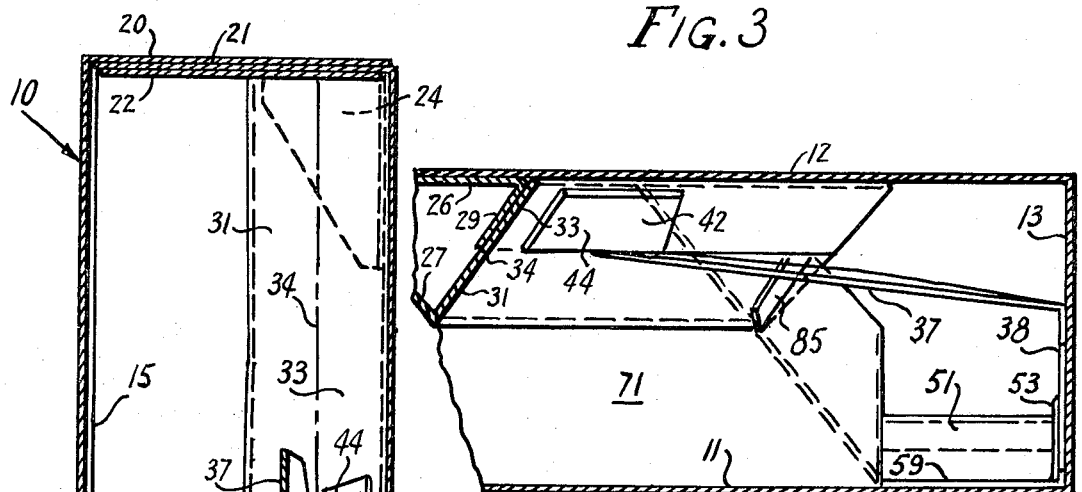
FIG. 4 is a fragmentary horizontal sectional view taken along the line 4—4 of FIG. 1 looking in the direction of the arrows.
Figure 5:
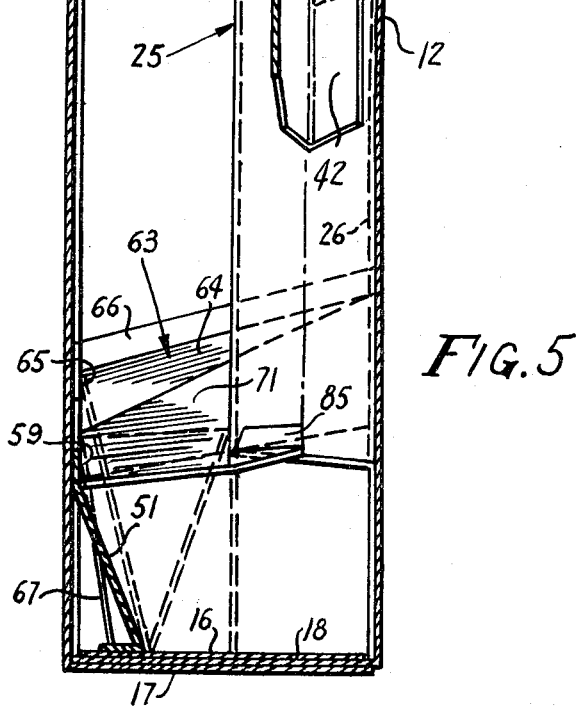
FIG. 5 is a vertical sectional view taken along the line 5—5 of FIG. 1 looking in the direction of the arrows.
Figure 6:
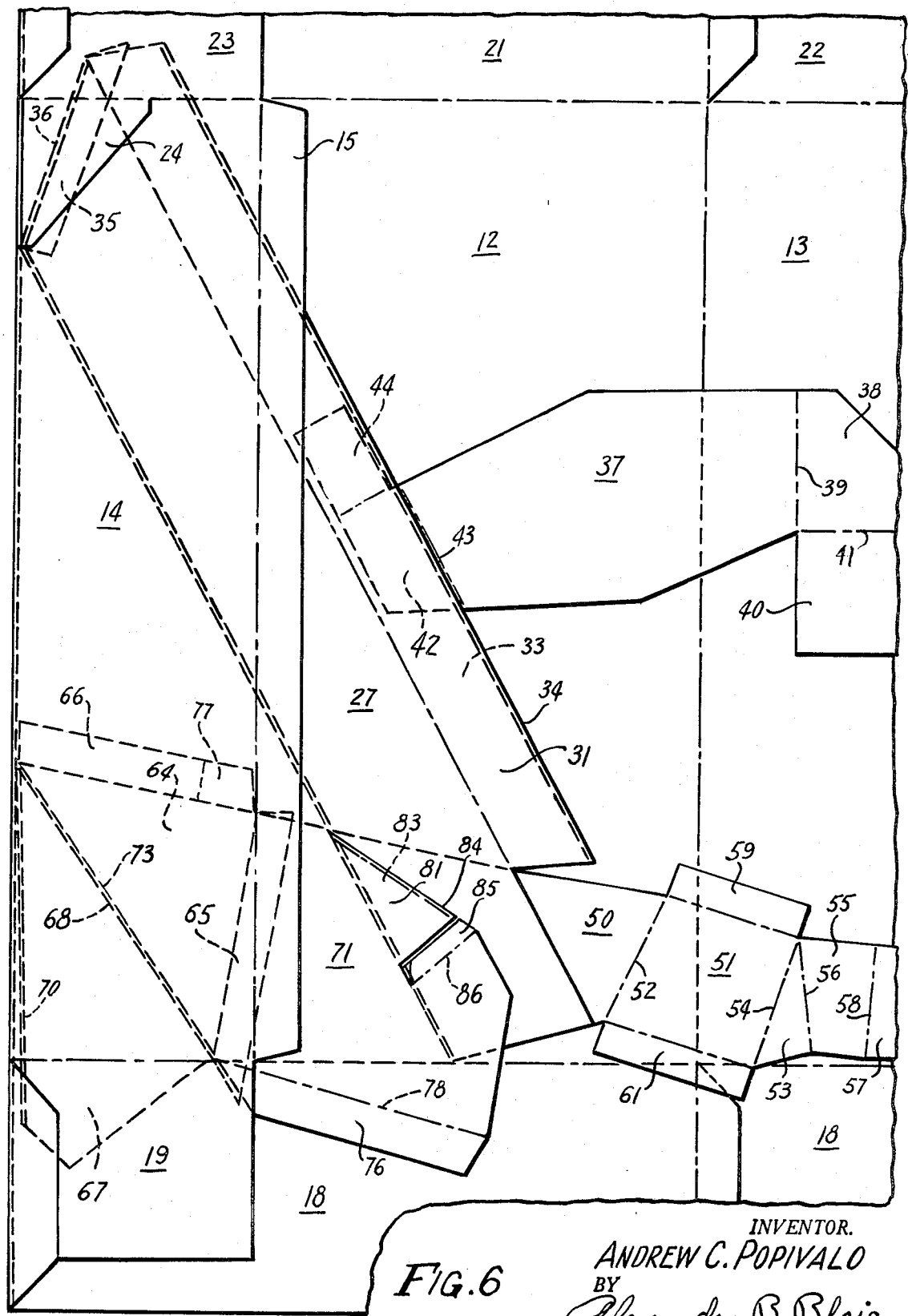
FIG. 6 is a fragmentary plan view of the invention shown in collapsed position.

Referring now to the drawings in detail wherein like reference characters indicate like parts throughout the several figures, the reference numeral 10 indicates generally a dispensing container constructed in accordance with the invention.

The dispensing container 10 includes a generally rectangular front panel 11, a generally rectangular rear panel 12, a generally rectangular side panel 13 integrally connected to the front panel 11 and the rear panel 12 and a generally rectangular side panel 14 integrally connected to the rear panel 12 and having a glue flap 15 integrally connected to its front edge.

The rear panel 12 has a generally rectangular bottom panel 16 integrally formed on the lower edge thereof and the front panel 11 has a generally rectangular bottom panel 17 integrally formed on the lower edge thereof.

A bottom flap 18 is integrally secured to the lower edge of the side panel 13 and a second bottom flap 19 is integrally secured to the lower edge of the side panel 14. The bottom panel 16, 17 and the bottom flaps 18, 19 are each foldable inwardly and secured together to form a generally rectangular bottom wall for the container 10.

A generally rectangular top panel 20 is integrally secured to the upper edge of the front panel 11 and a generally rectangular top panel 21 is integrally secured to the upper edge of the rear panel 12. A top flap 22 is integrally secured to the side panel 13 and a second top flap 23 is integrally secured to the side panel 14. The top panels 20, 21 and the top flaps 22, 23 are adapted to be folded into abutting relation and secured together to form the top wall of the container 10. The container 10 described above is a conventional single blank paperboard construction which is folded and glued to form a generally rectangular container in a conventional manner. The upper end of the side panel 14 is provided with a tear-open dispensing flap 24 to permit the contents of the container 10 to be dispensed at will.

A dispensing chute generally indicated at 25 is mounted within the container 10 extending from the dispensing flap 24 sloping downwardly and inwardly to the bottom of the container 10. The chute 25 is adapted to fold from a flat position to an erected position as the container 10 is erected for filling.

The chute 25 has an elongate panel 26 joined to a second elongate panel 27 along a fold line 28. An elongate glue flap 29 is integrally joined to the opposite side of the panel 26 along a fold line 30. An elongate side panel 31 is integrally joined to the elongate panel 27 along a fold line 32 an a glue flap 33 is integrally joined to the side panel 31 along a fold line 34. The fold lines 28, 30, 32, and 34 extend parallel to each other and with the chute 25 in folded position, the glue flap 29 and the glue flap 33 overlie each other and are glued together. A flap 35 is integrally joined to the upper edge of the elongate panel 27 along a fold line 36 for reasons to be described.

A support and erecting panel 37 has an outer end portion 38 integrally joined thereto along a fold line 39 with a glue flap 40 integrally joined to the outer end portion along a fold line 41. An inner end portion 42 is integrally joined to the panel 37 along a fold line 43 and has a glue flap 44 integrally joined to a side edge thereof along a fold line 45. The chute 25 is secured to the rear panel 12 by having the elongate panel 26 glued thereto and extending diagonally thereacross. The glue flap 40 is glued to the side panel 13 and the glue flap 44 is glued to the glue flap 33 with the support and errecting panel 37 extending between the chute 25 and the side panel 13. With the chute 25 glued to the back panel 12 an upper edge 46 of the panel 26 engages the upper portion of the side panel 14 and a second upper edge 47 of the panel 26 extending perpendicularly to the upper edge 46 engages the top flap 23. The flap 35 is glued to the side panel 14 after the dispensing container 10 is erected.

With the dispensing container 10 erected, the sloping top edge 48 of the side panel 31 and the sloping top edge 49 of the glue flap 33 each engage the top flap 23 to prevent spillage from the chute 25.

A panel 50 is secured to the lower end portion of the elongate panel 27 and extends laterally therefrom. A generally rectangular cup panel 51 is integrally joined to the panel 50 along a fold line 52. A triangular panel 53 is integrally joined to the cup panel 51 along a fold line 54 parallel to the fold line 52. A support panel 55 is integrally joined to the triangular panel along a fold line 56. A glue flap 57 is integrally joined to the support panel 55 along a fold line 58. A flap 59 is integrally formed on the cup panel 51 along a fold line 60. A second flap 61 is integrally joined to the opposite side of the cup panel 51 along a fold line 62.

The angle of fold line 52 determines the slope of panel 51, from front panel 11 towards rear panel 12, the object being to gravitationally urge the contents to an area underneath entrance to chute 25. This angle also partially determines the capacity of the measuring cup. Triangular panel 53 is designed only to position fold line 54 parallel to fold line 52.

The angular position of panel 50 also serves a useful purpose when container 10 is in a horizontal pouring position. At that time panel 50 channels material within the measuring cup from front panel 11 towards rear panel 12 and underneath entrance to chute 25.

With the container 10 in erected position, the flap 61 is pressed against the flap 18 on the lower end of the side panel 13 and the flap 59 is pressed against the front panel 11. The cup panel 51, panel 50 and the bottom of the container 10, form a predetermined quantity cup which feeds into the chute 25 when the container 10 is inverted. The predetermined quantity cup can be constructed to feed any desired quantity into the chute 25, such as a half-cup detergent, a full-cup detergent or any other quantity. The triangular panel 53 and the support panel 55 fold on themselves and against the glue flap 57 with the container 10 in erect position so that the fold line 54 of the cup panel 51 is closely adjacent and parallel to the side panel 13.

A false bottom generally indicated at 63 is provided to prevent the contents of the container 10 from getting below the open top of the cup delineated by the cup panel 51. The false bottom 63 includes a triangular panel 64 having a flap 65 formed on one side edge thereof and a glue flap 66 formed on another side edge thereof. The glue flap 66 is glued to the side panel 14 with the triangular panel 64 sloping downwardly from the rear panel 12 toward the front panel 11 and transversely downwardly from the side panel 14 toward the side panel 13 to cause material supported thereon to flow toward the cup and open end of the chute 25. A substantially triangular support panel 67 is integrally joined to the triangular support panel 67 is integrally joined to the triangular panel 64 along a fold line 68 and a second generally triangular support panel 69 is integrally joined to the support panel 67 along a fold line 70 with the fold lines 68, 70 converging toward a point. The false bottom wall 63 also includes a flap panel 71 having a generally triangular support panel 72 integrally secured thereto along a fold line 73. A second generally triangular support panel 74 is integrally secured to the support panel 72 along a fold line 75. A pair of spaced apart parallel flaps 76, 77 are integrally secured to the panel 71 along fold lines 78, 79 respectively. The generally triangular panel 67 and the generally triangular panel 72 have an identical shape and are glued together throughout their full extent so that the fold line 68 becomes virtually coextensive with the fold line 73. The support panel 69 is folded under and its outer edge 80 extends upwardly to the flue flap 66. The support panel 74 is also folded under an extends upwardly to the glue flap 77.

A triangular flap 81 is integrally joined to the free edge of the panel 71 along a fold line 82. A triangular glue flap 83 is joined to the flap 81 along a fold line 84. A small flap 85 is joined to the panel 71 along a fold line 86 as can be best seen in FIG. 7. The glue flap 77 is glued to the rear panel 12 and the glue flap 83 is glued to the panel 50. The panel 64 and the panel 71 lie in the same plane after the container 10 is erected guiding material in the container toward the cup.

The container 10 is assembled with the dispensing elements contained therein, with all parts folded so as to provide a flat easily shippable object. The flat container 10 is erected by an abrupt powerful force from rapid packaging machinery. The support and erecting panel 37 provides a thrust at fold line 45 having both vertical and horizontal components of motion in order to open chute 25 from its collapsed position. When chute 25 has been completely opened by pressure through panel 37, panel 37 has rotated slightly in a counter clockwise direction on fold line 41.

Having thus described the preferred embodiment of the invention it should be understood that numerous structural modifications and adaptations may be resorted to without departing from the spirit of the invention.

What is claimed is:

1. A dispensing container transformable from an assembled flat collapsed state to an expanded erect state comprising in erect state a generally rectangular box, a dispensing cup positioned in said box adjacent the bottom thereof for dispensing a predetermined quantity of the contents of said box upon inverting said box, a chute extending from said dispensing cup to an opening in the side of said box for conveying material dispensed from said cup out of said box, said dispensing cup and said chute also transformable with said container from an assembled flat collapsed state to an expanded erect state, said chute being secured in said box in downwardly and inwardly sloping relation terminating at its lower end at said cup, and a chute erecting and support panel extending between said chute and said container for applying a combined vertical and horizontal thrust to said chute as said container is erected.

2. A dispensing container transformable from an assembled flat collapsed state to an expanded erect state comprising in erect state a generally rectangular box, a dispensing cup positioned in said box adjacent the bottom thereof for dispensing a predetermined quantity of the contents of said box upon inverting said box, a chute extending from said dispensing cup to an opening in the side of said box for conveying material dispensed from said cup out of said box, said dispensing cup and said chute also transformable with said container from an assembled flat collapsed state to an expanded erect state, a false collapsible bottom wall supported in said container to feed material in said container to said cup, and said false bottom wall including a downwardly and diagonally folding portion with a diagonally disposed projecting panel extending below the fold line of said folding portion for receiving and transmitting an upward thrust to said false bottom on erection of said container.

3. A dispensing container transformable from an assembled flat collapsed state to an expanded erect state comprising in erect state a generally rectangular box, a dispensing cup positioned in said box adjacent the bottom thereof for dispensing a predetermined quantity of the contents of said box upon inverting said box, a chute extending from said dispensing cup to an opening in the side of said box for conveying material dispensed from said cup out of said box, said dispensing cup and said chute also transformable with said container from an assembled flat collapsed state to an expanded erect state, a false collapsible bottom wall supported in said container to feed material in said container to said cup, said false bottom wall foldable from a flat shippable position to an erect position for use, and said false bottom wall including a downwardly and diagonally folding portion with a diagonally disposed projecting panel extending below the fold line of said folding portion for receiving and transmitting an upward thrust to said false bottom on erection of said container.

* * * * *